Nov. 13, 1945.   F. B. HARVUOT   2,388,843
SLOW FEED INDICATOR
Filed April 5, 1943
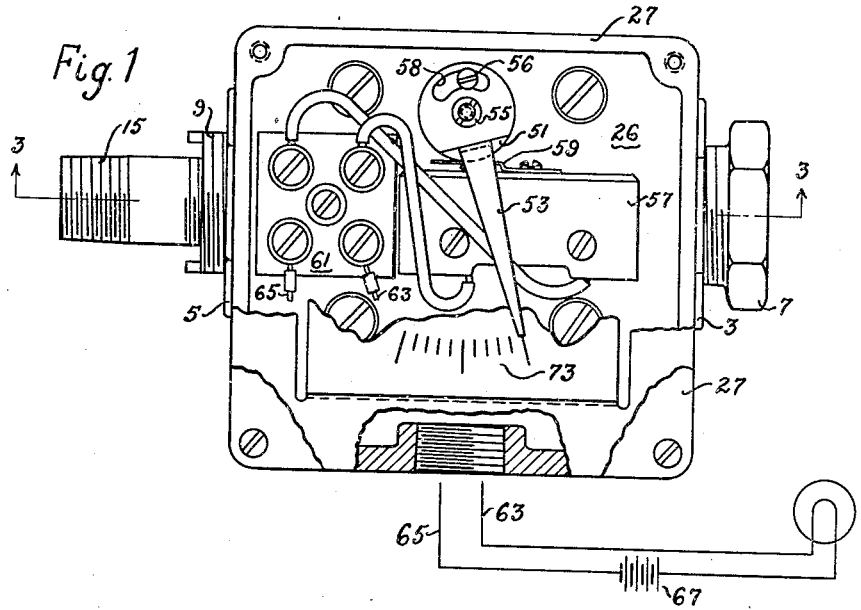
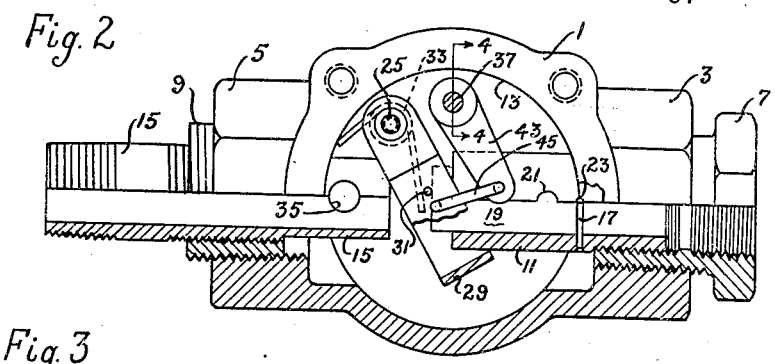
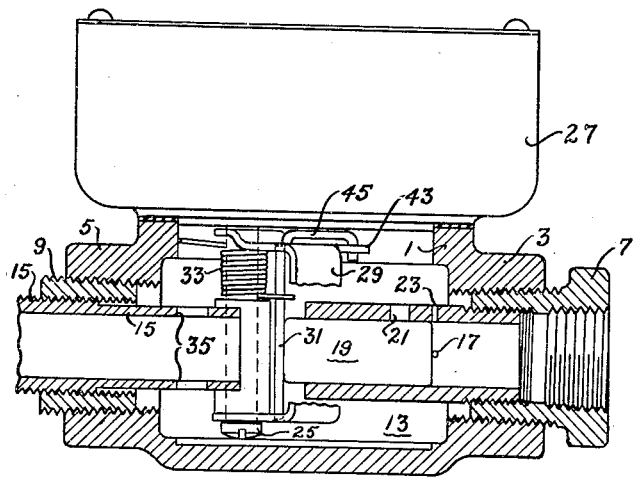
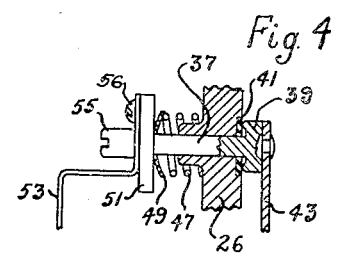
FRANK B. HARVUOT
INVENTOR.
BY Edmund W. E. Kamm
ATTORNEY Patented Nov. 13, 1945

2,388,843

UNITED STATES PATENT OFFICE 2,388,843

SLOW FEED INDICATOR

Frank B. Harvuot, Fort Wayne, Ind., assignor to S. F. Bowser & Company, Incorporated, Fort Wayne, Ind., a corporation of Indiana Application April 5, 1943, Serial No. 481,948

5 Claims. (Cl. 200—81)

This invention relates to a liquid flow indicator. More specifically, it relates to a device which will indicate the approximate rate of very slow flows of liquid and signal when the flow stops.

In previous devices which have been available it has been difficult to secure enough movement in response to the starting and stopping of very slow flows of liquid to actuate a signal device.

One object of the invention is to provide an indicating mechanism which is responsive to the flow of relatively small amounts of liquid.

Another object of the invention is to provide a compact mechanism which will actuate signal equipment which is independent of the indicator itself.

These and other objects will become apparent from a study of the specification and the drawing which is attached thereto and made a part thereof, and in which:

Figure 1 is an elevation showing the indicator and the control switch.

Figure 2 is an elevation, partly in section, showing the fluid chamber and the actuating means.

Figure 3 is a partially sectional view of the mechanism of Figure 2.

Figure 4 is a sectional view taken on the line 4—4 of Figure 2 showing some parts in full.

Referring now to the drawing, numeral 1 represents a body member having inlet and outlet bosses 3, 5 which are threaded to receive bushings 7, 9. The bushings are also internally threaded and an inlet tube 11 is screwed into bushing 7 and extends into the liquid chamber 13 in the body while an outlet tube 15 extends through the bushing 9 into the liquid chamber. The outer end of tube 15 is threaded for connection to a pipe line while bushing 7 is internally threaded outwardly of the tube 11 to receive a pipe.

A pin 17 extends across the tube 11 to limit the movement of a piston 19 which rides in the tube. The tube is provided with a round, radial hole 21 which is in reality a calibrated orifice, the effective size of which is detremined by the position of the piston relative to the hole. This orifice permits liquid to pass from tube 11 to the chamber 13. A second radial hole 23 which is about $\frac{1}{32}$" diameter is drilled in tube 11 to serve as an air bleeder when starting with an empty line. This hole is disposed in about the same plane as pin 17.

The size and number of holes 21 will vary depending upon the viscosity and pressure of the liquid and the quantity which it is desired to pass through the indicator.

By actual test it has been found that, using kerosene, to secure a minimum flow of a pint per minute and a maximum flow of three quarts per minute, at a pressure of between 40 to 80 p. s. i., a single $\frac{1}{16}$" diameter hole 21 will be used.

On the other hand, when an oil having viscosity of 300 to 700 S. S. U. at 100 degrees Fahrenheit and at pressures between 40 to 80 p. s. i., two $\frac{7}{32}$" diameter holes 21 will be required to secure the same maximum and minimum flows of three quarts to one pint per minute.

A screw 25 is mounted in the rear wall 26 of the indicator housing or case 27 which is screwed in place on the body 1. Mounted on the screw 25 is a bail 29 which carries a transverse pin 31. A spring 33 is mounted on the screw and bears at one end on the pin 31 and at the other end on the body 1. The spring forces the bail in a counterclockwise direction (Fig. 2) and forces the pin 31 into contact with the piston 19 which extends beyond tube 11 even when it contacts pin 17, and forces the piston into contact with the pin 17.

The outlet tube 15 is adjustable in the bushing 9 so that it will serve as a stop for pin 31, and consequently for piston 19, to prevent it from being blown out of the tube 11. The tube 15 is provided with large radial holes 35 which permit free passage of liquid to the outlet even when the piston is forced closely adjacent the end of tube 15.

A shaft 37 is mounted in the wall 26 and passes through it. In chamber 13 it carries a head 39 which rides upon a sealing ring 41. The shaft carries an arm 43, in chamber 13, which is connected by a link 45 to the bail 29.

The end of shaft 37 in the case 27 carries a compression spring 47, a spring retainer 49, a cam 51, an indicator 53 and a nut 55 which holds all of the parts in position on the shaft. Spring 47 holds head 39 against the sealing ring 41. The shaft is of reduced diameter in the portion receiving the cam and indicator so that the latter parts will be clamped on the shaft by the nut. A screw 56 and slot 58 permit relative adjustment of the cam and indicator.

Mounted in the case is a "Micro-Switch" 57 which is preferably normally closed, but it can be of the normally open type in which case its operation would be reversed. The operating lever 59 of this switch is disposed to be actuated by the cam 51. The switch is connected to a terminal block 61 from which wires 63, 65 lead to a battery 67 or other source of power, and to a signal lamp 69 or other signal device.

The spring 33 is designed to maintain a pressure of two pounds on the plunger when it is in the port closing position. The tube 11 is preferably one-half inch in internal diameter and the piston is fitted in the tube so as to slide therein.

The cam 51 and indicator are adjusted so that the cam will relieve pressure on switch lever 59 when the indicator, moving in a counterclockwise direction (Fig. 1), indicates the central graduation on scale 73. At this point the piston has just closed the opening 21, and since the switch closes when pressure on lever 59 is relieved, the signal will be energized.

*Operation*

Assuming that there is no pressure on the device and that a normally closed switch is used, the piston 19 and indicator 53 will occupy their extreme right-hand positions (Figs. 1 and 2) and the cam will hold the switch lever 59 down to hold the switch open.

As pressure is applied to the inlet tube, all of the trapped air and a little fluid will leak through hole 23. The amount of liquid leakage is not sufficient to relieve the pressure on the piston under ordinary operating conditions so that it will eventually move away from pin 17 and, against the action of spring 33, will move pin 31 and bail 29 in the clockwise direction. This movement is transmitted by link 45 to arm 43 and shaft 37 and thence to cam 51 and indicator 53. As the piston continues to move to the left it will uncover the opening or openings 21, and as soon as this is accomplished the indicator and cam will have reached the position in which the micro-switch actuator is released by the cam, whereupon the switch closes and the signal circuit is energized. The pointer will indicate the central mark of the scale or lie slightly to the left thereof to indicate that there is a flow of liquid.

The piston will be moved to the position in which the port openings will release sufficient liquid to balance the fluid and spring pressures on the piston. The indicator 53 will then indicate the proportion of the port opening on scale 73. The leftward movement (Fig. 2) of the piston is limited by contact between pin 31 and the end of tube 15. The tube is adjusted so that movement of the piston will be stopped when the port or ports 21 are fully open.

The liquid issues through port 21, enters the chamber 13 and passes through the holes 35 or the inner end of the tube 15 to the outlet.

When the liquid pressure is cut off, the piston and associated parts will move to the right (Fig. 2) under action of the spring 33 until port 21 is closed, and will continue until piston 19 contacts pin 17. The liquid displaced by the piston after it covers port 21 will escape through the small port 23.

As soon as port 21 is closed the micro-switch actuator is depressed by the cam, the switch is opened and the signal circuit is deenergized.

It is of course obvious that by using a normally open switch or a cam of reversed contour, the signal circuit can be energized when the flow stops and deenergized when a flow is established.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In an indicator for slow flows of liquid, the combination of a body member having an inlet and a continually open outlet, a tube mounted in said inlet, a small, radially directed port in said tube, a plunger in said tube mounted for movement over said port by pressure of said inlet liquid to open said port as said pressure increases, a tube adjustably mounted in said outlet, means cooperating with said adjustable tube and said plunger for limiting the stroke of said plunger, and means actuated by the plunger for indicating the position thereof.

2. In an indicator for slow flows of liquid, the combination of a body member having an inlet and an outlet, a tube mounted in said inlet, a calibrated port in said tube, a plunger movably mounted in said tube and adapted to open said port in response to inlet pressure, a lever pivotally mounted in said body and adapted to bear on said plunger, a spring mounted in said body and adapted to force said lever toward said plunger, an indicator case mounted on said body but sealed therefrom, a shaft mounted to pass from said body into said case, an arm on said shaft in said body, a link connecting said lever and said arm, an indicator mounted on said shaft in said case, and an adjustable tube in said outlet extending to a point adjacent said lever to serve as a stop therefor.

3. In an indicator for slow flows of liquid, the combination of a body member having an inlet and an outlet, a tube mounted in said body and connected with the inlet, a small, radially directed port in said tube, a plunger in said tube mounted for movement by pressure of said inlet liquid and movable over said port to control the effective size of said port, an indicator connected to be operated by said plunger, a cam mounted for operation with said indicator, and a signal switch disposed for operation by said cam.

4. In an indicator for slow flows of liquid, the combination of a body member having an inlet and an outlet, a tube mounted in said inlet, a port in said tube, a plunger in said tube mounted for movement by pressure of said inlet liquid to control said port, yieldable means acting on said plunger in opposition to said pressure, means for positioning said plunger in its no-flow position, a continuously open bleeder port in said tube disposed upstream of the plunger when it is in contact with said last named means to maintain continuous communication between said inlet and outlet, a tube adjustably mounted in said outlet, and means cooperating with said outlet tube and said plunger for limiting the stroke of said plunger in the full-flow position.

5. In an indicator for slow flows of liquid, the combination of a body member having an inlet and an outlet, a tube mounted in said inlet, a small, radially directed port in said tube, a plunger in said tube mounted for movement by pressure of said inlet liquid to open and close said port in proportion to the pressure in said tube, yieldable means acting on said plunger in opposition to said pressure, a stop for said plunger, said plunger being adapted to entirely close said port when it is in contact with the stop, and a continuously open but restricted bleeder port in said tube disposed upstream of the plunger when it is in contact with said stop to maintain continuous communication between said inlet and outlet.

FRANK B. HARVUOT.